Patented Dec. 2, 1952

2,620,277

UNITED STATES PATENT OFFICE 2,620,277

PRESERVING PEELED WHITE POTATOES

Corrado Scalera, Providence, R. I., assignor of one-half to Anthony Longo, Cranston, R. I.

No Drawing. Application February 25, 1949, Serial No. 78,475

2 Claims. (Cl. 99—154)

This invention relates to the preparation, storage and subsequent cooking of white potatoes and is concerned more particularly with the preserving of white potatoes after peeling.

The sale on the produce market of the ready-for-cooking peeled potato, either for boiled, mashed or fried purposes, is fast becoming an important factor. However, great loss is experienced by the packer and the consumer because the pared or peeled potato quickly oxidizes or there occurs an evaporation of the natural moisture from the potato. Unless these potatoes are kept submerged in water both at home or in storage, they not only lose their economic value, but their exceptional palatable value to the consumer and also their higher-lasting edible qualities.

In the practice of storing the peeled potato submerged in water, the problem of transportation became serious, as this practice necessarily involves the transportation of large volumes of water in iron containers, the bulk and weight of which equaled or exceeded that of the potatoes themselves.

In order to avoid this practice, a process of preserving peeled potatoes was developed, in which the peeled potatoes were subjected to a brief treatment of sulphur dioxide, coupled with refrigeration above the freezing point and then packaging these potatoes in sealed containers and maintaining refrigeration. This process required close controls as, if the concentration of sulphur dioxide in the aqueous solution to which the potatoes were subjected exceeded 6 per cent, then it was found that a hard jacket formed about the peeled potato and that this remained to some extent after cooking.

One of the objects of this invention is to improve upon the old process of storing the potatoes under water and transporting them under water and at the same time improving upon the process of treatment by sulphur dioxide which required a sealed container and the forming of a hard jacket if too great a concentration of sulphur dioxide was encountered.

A more specific object of this invention is to provide for the treatment with a larger concentration of sulphur dioxide than has heretofore been found possible and to eliminate the necessity of the use of a sealed container after processing.

A further object of this invention is to coat the peeled potato with a salt which gives a desirable taste to the potato and at the same time aids in the keeping quality of the exposed product.

Another specific object of this invention is to eliminate the formation of any hard jacket upon the potato by reason of high concentrations of sulphur dioxide.

The white potatoes to be treated are peeled in any appropriate manner such as by friction and then these potatoes may be stored under water or in some manner to exclude air therefrom until the treatment is ready, or they may be directly treated by subjecting them to a freshly prepared bath which is constituted as follows:

To 30 gallons of water in a stainless steel container I add 1 pound of sodium sulphite and ½ pound of citric acid crystals. The solution thus prepared is maintained at 40 degrees Fahrenheit.

The peeled potatoes, as freshly peeled, are carried by a conveyor and dropped into white cotton bags and then the potatoes in these bags are immersed in the solution so prepared.

The citric acid aids in the liberation of sulphur dioxide and in the proportions which I have stated serves to liberate about all of the available sulphur dioxide, which is about 8.5 per cent, in the solution. The chemical reaction which takes place is such as to yield sodium citrate plus sulphurous acid, sulphurous acid being an unstable weak acid which breaks down to release sulphur dioxide which contains certain bleaching properties which it imparts as an anti-oxidant. The sodium citrate forms a white crystalline salt which deposits upon the surface of the potato and aids in keeping the quality of the exposed portion of the potato while imparting a slight cool saline taste to the potato and preventing the formation of a hard jacket on the potato. Maintaining the solution at a temperature not exceeding 40 degrees reduces loss of the sulphur dioxide as a gas.

The potatoes are first immersed in the solution for about one minute, and while a longer immersing will not be harmful, any longer immersion is unnecessary. The treated potatoes are then returned to a drainboard and a conveyor where they are inspected for any blemishes which might be removed by hand to enhance the appearance of the product. Potates after such inspection are then returned to the white cotton immersion bags and the bags again returned to the treatment solution for one minute. The potatoes are then removed from the bags and placed in clean baskets or wooden crates and stored where they may be exposed to air which will be cooled by refrigeration and kept at approximately 40 degrees Fahrenheit. This temperature with the sodium citrate coating is sufficient to guard against any oxidation and it is unnecessary to place the potatoes in sealed containers. When taken from this refrigeration for delivery, the potatoes are packed in moisture-proof brown paper bags for shipment. In some cases the potatoes when taken from the solution they are placed directly in the brown paper bags and shipped. In other cases instead of shipping immediately the potatoes in the brown paper bags may be stored under refrigeration at 40° F. and then later shipped all in accordance with the particular convenience at the time. In the handling of the potatoes an attempt is made to prevent bruising the potatoes, as it is found that the bruise may in some cases cause discoloration.

By this process it is unnecessary to place the potatoes in sealed containers, as they may be exposed to air during storage or transportation without harm. The anti-oxidizing effect of the sulphur dioxide may be increased to a very substantial percentage without forming a hard jacket on the potatoes, which makes the process much simpler, quicker and more permanent than where precautions against a high percentage of sulphur dioxide or a sealing of the container is necessary.

I claim:

1. The process of preserving raw peeled white potatoes and preventing discoloration thereof and hard jackets forming thereon, comprising treating the peeled potatoes over their raw exposed peeled areas with an aqueous solution having approximately from 6 to 8.5 per cent available $SO_2$, the solution being made acid by a citrate in a quantity to liberate all the quantity of $SO_2$ present in the solution, the temperature of the solution being maintained between 32° and 40° F. and then storing said treated potatoes exposed to air but under refrigeration.

2. The process of preserving raw peeled white potatoes and preventing discoloration thereof and hard jackets forming thereon, comprising treating the peeled potatoes over their raw exposed peeled areas with an aqueous solution formed by substantially two parts by weight of sodium sulfite and one part of citric acid to liberate substantially all of the $SO_2$ present in the sodium sulfite, the temperature of the solution being maintained between 32° and 40° F. and then storing said treated potatoes exposed to air but under refrigeration.

CORRADO SCALERA.

REFERENCES CITED

The following references are of record in the file of this patent:

UNITED STATES PATENTS

| Number | Name | Date |
|---|---|---|
| 611,017 | Neumann | Sept. 20, 1898 |
| 2,178,675 | Thomas | Nov. 7, 1939 |
| 2,298,933 | Elion | Oct. 13, 1942 |
| 2,420,322 | Matarazzo | May 13, 1947 |
| 2,506,793 | Kalmar et al. | May 9, 1950 |